United States Patent [19]
Kocherginsky et al.

[11] 3,907,603
[45] Sept. 23, 1975

[54] STORAGE CELL WITH DISSOLUBLE NEGATIVE LINE ELECTRODES

[76] Inventors: Meer Danilovich Kocherginsky, ul. Komarova 6, kv. 23; Sergei Leonidovich Kalachev, ul. Chasovaya, 26, kv. 106; Victor Arsenievich Naumenko, Novoslobodskaya ul., 62, kv. 64; Lidia Fedorovna Penkova, ul. 3 Mytischinskaya 14a, kv. 124, all of Moscow, U.S.S.R.

[22] Filed: Aug. 15, 1973

[21] Appl. No.: 388,641

Related U.S. Application Data

[63] Continuation-in-part of Ser. No. 327,848, Jan. 29, 1973, abandoned, which is a continuation of Ser. No. 98,762, Dec. 16, 1970, abandoned.

[52] U.S. Cl. ................... 136/140; 136/30; 136/141
[51] Int. Cl.$^2$ ........................................ H01M 6/00
[58] Field of Search ............. 136/6 R, 30, 140, 141, 136/168, 86 A; 204/157.15

[56] References Cited
UNITED STATES PATENTS

| | | | |
|---|---|---|---|
| 383,706 | 4/1888 | Cox | 136/140 |
| 390,675 | 10/1888 | Humphreys | 136/140 |
| 2,594,713 | 4/1952 | Andre | 136/6 B |
| 3,532,548 | 10/1970 | Stachurski | 136/86 A |
| 3,536,535 | 10/1970 | Lippincott | 136/140 |
| 3,560,261 | 2/1971 | Stachurski et al. | 136/6 R |

*Primary Examiner*—Patrick P. Garvin
*Assistant Examiner*—John F. Niebling
*Attorney, Agent, or Firm*—Waters, Schwartz & Nissen

[57] ABSTRACT

A storage cell comprising an electrolyte-filled jar in which are disposed dissoluble zinc electrodes and positive electrodes fabricated from oxides of nickel or silver or air-depolarized electrodes, with perforated separators disposed therebetween. The dissoluble zinc electrodes and positive electrodes are provided with current-collectors, the current-collectors of the dissoluble zinc electrodes being connected to a means for imparting vibration to the zinc dissoluble electrodes in a manner ensuring mechanical interaction between the whole surface of the dissoluble zinc electrodes and the plastic separators and compaction of the sponge-zinc deposit forming on the electrodes in the course of charging.

To provide intensive stirring and accelerate the dissolution of the zinc oxide deposit accumulating on the bottom of the jar in the course of discharging, the ends of the zinc electrodes adjacent to the bottom of the jar are bent at a certain angle or connected in pairs by a perforated plate.

The dissoluble zinc electrodes consist of at least two layers, the layer adjacent to the plastic separator having a lesser porosity, while the means for imparting vibration to the dissoluble zinc electrodes is a cam drive.

14 Claims, 6 Drawing Figures

STORAGE CELL WITH DISSOLUBLE NEGATIVE LINE ELECTRODES

The present application is a continuation-in-part of our co-pending application No. 327,848 filed Jan. 29, 1973, now abandoned which in turn was a continuation of Ser. No. 98,762 filed Dec. 16, 1970 also now abandoned.

The present invention relates to electrochemical sources of electricity, and more specifically to storage cells using an alkaline electrolyte with dissoluble zinc electrodes, adapted to move in the course of charging.

In the known storage cells with moving zinc electrodes use is made of rotating disc electrodes mounted on a common rotating pin passing through the center of the electrodes or electrodes made in the form of a continuous band moved by a system of rollers.

On the moving zinc electrodes, zinc is generally deposited in the form of a compact non-porous deposit. After 2 – 3 charge-discharge cycles, zinc dendrite sponge deposit begins to appear on the surface of such electrodes. In order to prevent the zinc electrodes of opposite polarity from coming into contact through the zinc dendrites, a special roller intended for smoothing the zinc dendrites is mounted in the interelectrode space.

A disadvantage of the storage cells with moving zinc electrodes having a compact zinc deposit consists in the low activity of the zinc electrodes, resulting in large consumption of electrolyte per unit of capacity and low specific energy of the storage cell. Storage cells provided with a smoothing roller require a large interelectrode clearance (up to 2 cm) for this roller to be disposed in the clearance space. This also leads to large consumption of electrolyte and reduces the specific energy of the storage cell. An essential disadvantage of the storage cells with smoothing rollers consists in that the electrodes of opposite polarity are not prevented from contacting each other due to deformation and warpage of the electrodes in the course of cycling. The latter is especially characteristic of large-size electrodes. Another disadvantage of the known storage cells with moving zinc electrodes arises from the necessity of using sliding contacts therein having increased junction resistance, especially due to the effect of the alkaline electrolyte on contacting surfaces. For the above reasons, storage cells with moving zinc electrodes are practically not used at present.

An object of the present invention is to provide storage cells with moving zinc electrodes, having a long service life, simple structure, high specific electrical characteristics and small charging time.

This object is attained in a storage cell according to the present invention, wherein plastic separators with holes are provided between the positive and dissoluble zinc electrodes with current collectors, said current collectors of the dissoluble zinc electrodes being connected to a means for imparting vibration to the dissoluble zinc electrodes so as to ensure mechanical interaction between the whole surface of the zinc electrodes and the plastic separators and compaction of the zinc-sponge deposit forming on the electrodes in the process of charging.

To provide intensive stirring and accelerate the dissolution of zinc oxide accumulating on the bottom of the jar in the course of discharging, it is preferred that the ends of the electrodes disposed near the bottom of the jar be bent at a certain angle or connected by a perforated plate.

The plastic separators in the storage cell, according to the present invention, may be embodied in the form of perforated plastic sheets of abrasion-resistant materials, such as hard polyvinylchloride or polyamide. The separators may also be fabricated from woven or pressed plastic grates or nets resistant to abrasion.

It is also expedient to dispose in the interelectrode clearance of the storage cell, according to the present invention, supports to which the positive electrodes and plastic separators are clamped, thereby providing a space for deposition of the sponge-zinc deposit. The supports prevent deformation of the positive electrodes in the course of cycling. The supports may be provided with slots in which the side edges of the zinc electrodes move. The slotted supports prevent deformation of both the positive and the zinc electrodes in the course of cycling.

It is further expedient that the dissoluble zinc electrode be composed of at least two layers, the layer adjacent to the plastic separator preferably being less porous. The porosity of the zinc electrode layer adjacent to the plastic separator should preferably be from 30 to 70 percent, while that of the inner layer contacting the current collector plate of the zinc electrode, should be within 70 to 90 percent.

As a means for imparting vibration to the zinc electrodes, it is expedient to use a cam drive connected to the current collectors from the negative electrodes, thus providing the most favorable oscillating circular motion of the zinc electrodes. In case the area of the storage cell base is limited (for example in transport vehicles), the current collectors of the zinc electrodes and the electrodes connected thereto are vibrated in the direction of the vertical axis of the storage cell.

To ensure reliable operation of the storage cell without short-circuiting when perforated separators are used, the amplitude of vibration of the zinc electrodes should exceed the diameter of the separator holes.

It is preferred to dispose at the bottom of the electrolyte jar an electrochemical filter in the form, for example, of a porous nickel plate which is vibrated when the storage cell is charged.

To ensure sealing of the storage cell, the moving current collector of the zinc electrodes is provided with an elastic compensator with a corrugated surface at least twice as large in total length as the distance between the points of securing the compensator to the current collector and cover.

Nickel-zinc storage batteries comprised of the storage cells according to the present invention have a specific energy from 45 to 50 W.h/kg and are completely charged within 45 min. Air-zinc and silver-zinc storage batteries according to the invention have a specific energy from 100 to 110 W.h/kg and are charged within 2 hours. All these types of storage batteries have long service life, determined by the service life of the positive electrodes. The high specific energy and power characteristics, fast charging and long service life make the storage batteries, according to the present invention, ideal for use on electromobiles intended for urban electrical passenger transport, thereby contributing to the cleanliness of the ambient air in large cities.

The present invention will be further explained hereafter in greater detail by way of examplary embodiments thereof with reference to the accompanying drawings, wherein.

Figure 1:
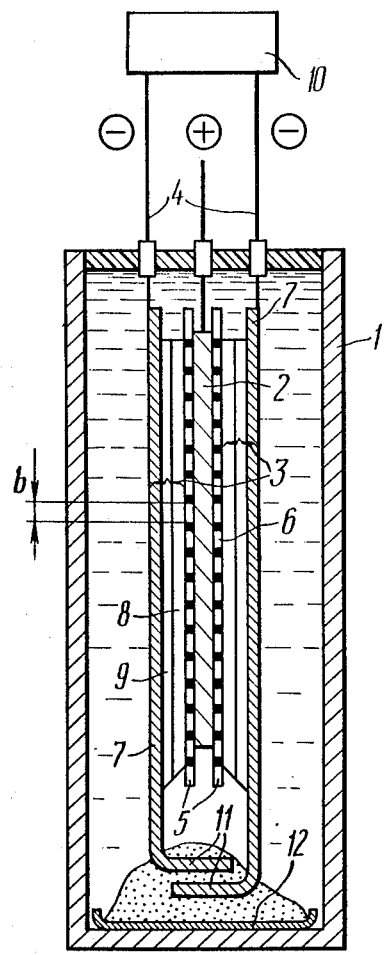
FIG. 1 shows schematically a sectional view of a storage cell with moving zinc electrodes, according to the invention.

Referring now to FIG. 1, therein is shown a storage cell which comprises a jar 1 containing electrolyte, inside which are disposed a positive electrode 2 and a zinc electrode 3 with current collectors 4, the electrodes being separated from each other by plastic separators 5 provided with holes 6. Each zinc electrode 3 consists of a current-collecting bar 7 on which are applied layers 8 and 9 of sponge-like, said layers 8, 9 having different porosity. The porosity of the layer 8 adjacent the plastic separator 5 is from 30 to 70 percent, while the porosity of the layer 9 contacting the current-collecting bar 7 is from 70 to 90 percent. Attached to the current collectors 4 of the zinc electrodes is a means 10 for imparting vibration to the zinc electrodes 3. The ends of the zinc electrodes 3, adjacent the bottom of the jar 1, are bent at right angles, forming a stirrer means 11. On the bottom of the jar 1 is an electrochemical filter 12 in the form of a porous nickel plate.

Figure 2:
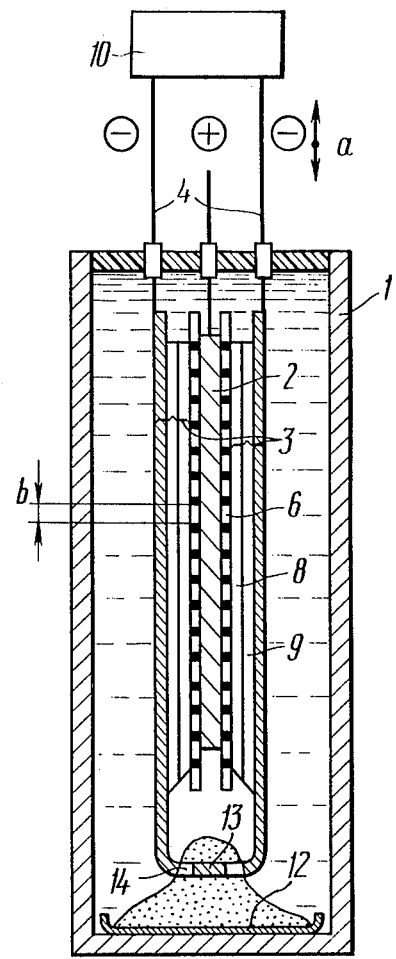
FIG. 2 is a schematic sectional view of a storage cell with moving zinc electrodes whose ends are provided with a perforated plate.

An embodiment of the storage cell is shown (FIG. 2) wherein the ends of the zinc electrodes 3 are provided with a plate 13 having holes 14, which promotes turbulence of the electrolyte and, therefore, acceleration of the charging process.

Figure 3:
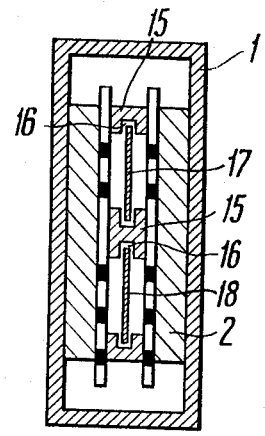
FIG. 3 is a sectional schematic plan view of the storage cell with moving zinc electrodes.
Figures 4, 5:
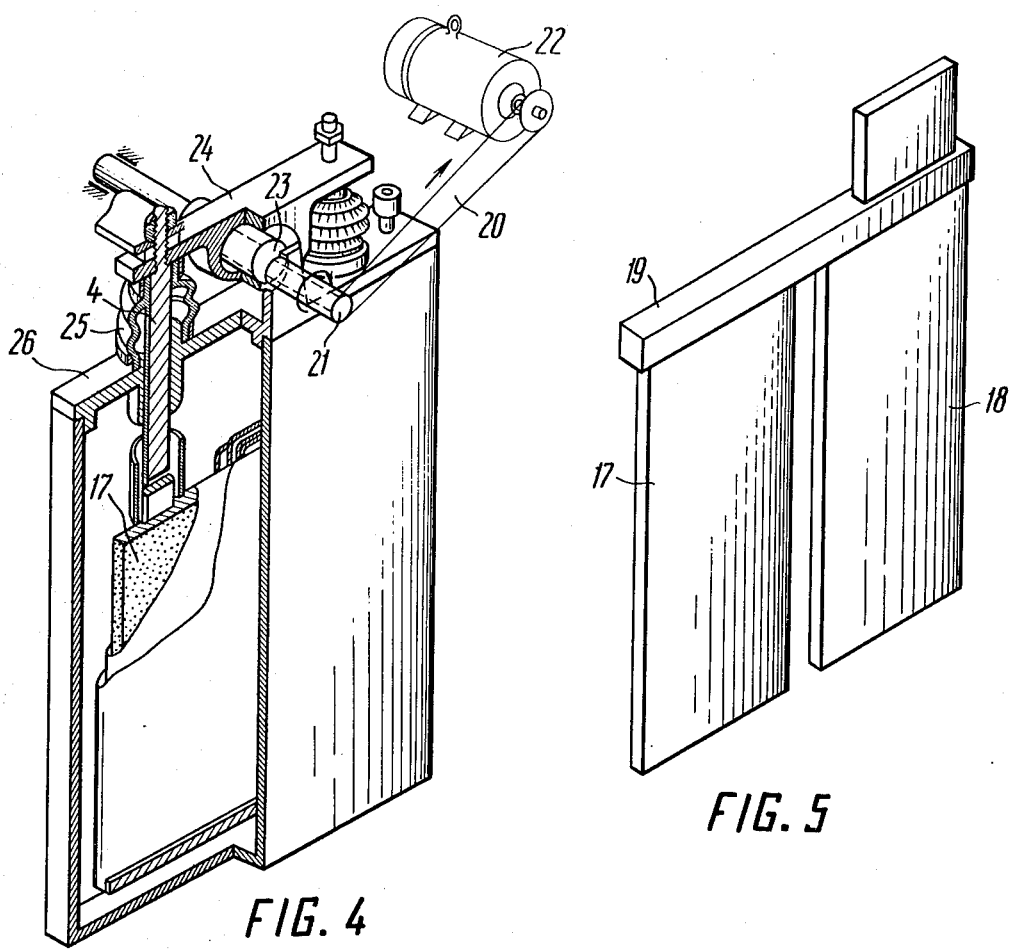
FIG. 4 is a perspective view partly broken away and in section of a storage cell with a means for imparting vibration to the zinc electrodes.
FIG. 5 is a perspective view of a zinc electrode according to the invention.

To prevent deformation of the positive electrodes 2, the plastic separators 5 are clamped thereto by means of supports 15 (FIG. 3). To prevent deformation of the negative electrodes, the supports 15 are provided with slots 16 in which move the side edges of the zinc electrodes 3 made of two parts 17 and 18 connected to each other by a bar 19 (FIGS. 3 and 5). The jar 1 with electrolyte encompases the assembly of the electrodes 2 and 3, enabling the zinc electrodes to move freely in the slots.

As the means 10 for imparting vibration to the current collectors 4 of the zinc electrodes and the negative electrodes 3 connected thereto, a cam drive 20 is used (FIG. 4) mounted on the outer surface of the jar 1 and coupled to the current collectors 4. A shaft 21 of the cam drive 20 is rotated by a motor 22. Fitted on the shaft 21 is a cam 23 which drives a plate 24 connected to the current collectors 4. The latter imparts vibration to the zinc electrodes 3. An elastic compensator 25 is fitted onto the zinc electrode current collector 4 to seal the storage cell.

Figure 6:
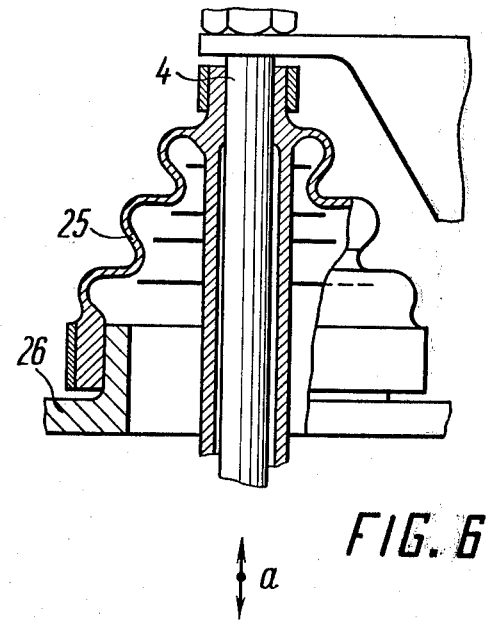
FIG. 6 is a sectional view of an elastic compensator for sealing the storage cell.

As seen in FIG. 6 wherein an enlarged view of the compensator 25 is shown, one end of the compensator is attached to the moving current collector 4 of the zinc electrodes 3 and the other end, to a cover 26 of the storage cell. To prevent the compensator from breaking due to prolonged operation, the total length of its corrugated surface is at least twice as great as the distance between the securing points on the current collector 4 and the cover 26 of the storage cell.

The operational mechanism of the storage cell according to the invention will be explained below together with the functional purposes of its separate parts. The plastic separators 5 and supports 15 (FIG. 3) in the storage cell according to the invention provide a fixed clearance between the electrodes, in which the zinc electrodes 3 are adapted to move freely. The functional purpose of the plastic separators consists not only in separation of electrodes of different polarity; they are also intended to act mechanically on the sponge-zinc deposit forming on the zinc electrode. The sponge-zinc deposit growing through the holes in the plastic separator towards the positive electrode is deflected from the direction of its growth at a right angle to the walls of the separator holes. As a result, the surface layer of the zinc electrode is compacted and smoothed. As the charge capacity increases, the compacted surface layer of zinc may reach up to 0.5 – 1.0 mm in thickness. The inner layer of sponge-zinc, contacting the zinc electrode current-collecting bar, is practically not compacted. After the cell is completely charged, all the space between the zinc electrode current-collecting bar and the plastic separator is filled with zinc. At this moment, the zinc electrode consists of the compacted zinc layer 8 adjacent to the plastic separator and the porous zinc layer 9 on the zinc electrode current-collecting bar. The double-porous structure of the zinc electrode permits the storage cell capacity to be increased.

After the storage cell is fully discharged, its electrolyte contains from 4 to 7 g/l of dissolved zinc. This electrolyte completely dissolves the compacted layer 8 of the zinc electrode though it is less active than the porous layer 8 on the zinc electrode current-collecting bar 7. Thus, the first step of discharge is the so-called primary process, i.e. the formation of zincates dissolved in the electrolyte. During the second step of discharging the more active porous layer of zinc contacting the zinc electrode, the current-collecting bar begins to react in the so-called secondary process, i.e. the formation of zinc oxide. During the secondary process, a suspension of zinc oxide in the electrolyte is formed together with the layer of zinc oxide on the zinc electrode current-collecting bar. It is expedient that the porosity of the compacted layer 8 be within 30 to 70 percent and that of the more porous inner layer 9, from 70 to 90 percent. The above porosity limits permit the charge capacity to be utilized within 70 to 85 percent, depending on the value of discharge current.

To ensure reliable operation of the storage cell without short-circuiting, the amplitude of the zinc electrode oscillation, i.e. the maximum distance travelled by any point of the zinc electrode in the direction of the vertical or horizontal axis for one period of oscillation, "$a$", should exceed the diameter "$b$" (FIG. 1) of the separator holes. In this case, the zinc sponge will be smoothed along the whole surface of the zinc electrode and will not contact the opposite electrode. The optimum thickness of the plastic separator is from 0.2 to 0.5 mm. The hole size in the separators may be from 0.5 to 10 mm and the amplitude of vibration of the zinc electrode from 1 to 20 mm. The optimum diameter of the separator holes is 3 mm and the optimum vibration amplitude is 12 mm. The frequency of the zinc electrode vibration may be from 10 to 1000 cycles per minute. The optimum frequency is from 100 to 300 cycles per minute. Since during operation the separators are subjected to abrasion under the action of the zinc sponge, they should be fabricated from abrasion-resistant materials, such as hard polyvinylchloride or polyamide.

The above-described cam means imparts circular vibration to the zinc electrodes. This motion provides a uniform compacting and smoothing over the whole surface of the zinc electrodes, into which the zinc sponge being formed during the charging is rubbed as it were. When the zinc electrodes are circularly vibrated, the metallic zinc particles substantially do not drop off the electrode.

A small amount of metallic zinc particles drops off the zinc electrodes during both the charging and discharging. To prevent accumulation of the metallic particles and their transfer into the solution, the electrochemical filter 12 (FIG. 1) is disposed at the bottom of the jar, said filter being fabricated from, for example, a porous nickel plate. When contacting the electrochemical filter, the zinc particles dissolve in the electrolyte in accordance with the reaction:

$$Zn + H_2O \rightarrow ZnO + H_2\uparrow$$

The electrochemical filter operation is intensified under the action of vibration caused by the electrolyte flows. The vibration of the electrochemical filter contributes to the fast removal of hydrogen bubbles from the surface thereof. Because the zinc particles contact the vibrating electrochemical filter with different portions of their surface, the contact between the particles and the filter is improved, thereby increasing the self-dissolution current of the zinc particles.

The stirrer means 11 formed on the ends of the zinc electrodes not only intensifies the process of dissolving the metallic zinc particles but also accelerates the dissolution of zinc oxide forming in the course of discharging and accumulated on the bottom of the storage cell jar. During the charging the zinc oxide is suspended in the electrolyte throughout the entire height of the jar.

After the air-zinc and silver-zinc storage cells discharge, their electrodes still retain, depending on the mode of discharge, from 15 to 30 percent of unutilized metallic zinc. To ensure proper deposition of zinc during the following cycle, the unitilized metallic zinc on the electrode should be dissolved. For this purpose, a portion of fresh electrolyte is added into the storage cell which is then discharged to the end. The two obtained portions of electrolyte are afterwards utilized in the process of charging. The nickel-zinc storage cells do not require changing the electrolyte for their full discharge.

The current-collecting bar 7 of the zinc electrodes 3 in the storage cell, according to the invention, is fabricated from a current-conducting inert material in the form of a plate or net on which the sponge-zinc deposit is deposited in the course of charging from the suspension of zinc oxide in the alkaline electrolyte. The current-collecting bar 7 may be fabricated, for example, from a low-carbon steel, thereby eliminating the transition of the substrate material into the solution during complete charging and discharging of the storage cell. The positive electrodes 2 may be made of nickel-oxide ceramic-metal or powder electrodes of lamellar or tubular types, ceramic-metal or powder silver-oxide electrodes, and also air-depolarized electrodes. The latter may be carbon or ceramic-metal based. The air-depolarized electrodes are manufactured according to the sequence of operations used in the production of fuel elements. In case air-depolarized electrodes are utilized, in order to avoid their destruction in the course of charging, it is expedient to use an auxiliary electrode made in a known manner, which is separated from the air-depolarized electrode by an additional separation layer.

Storage batteries are assembled from the above-described cells, connected in series. In the battery of cells, the moving current collector of the negative electrode of one cell is connected with a flexible bushar connector to the fixed positive current collector of the next cell. The battery is provided with a common drive also using a cam means, which concurrently imparts motion to all zinc electrodes of all storage cells.

What is claimed is:

1. A storage cell comprising: an electrolyte-filled jar; dissoluble zinc electrodes movably supported within said jar for undergoing movement in the course of charging; positive electrodes fabricated from oxides of nickel or silver or air-depolarized electrodes, disposed in said jar in spaced juxtaposition with said zinc electrodes; current-collectors for said zinc and positive electrodes; plastic separators with holes, disposed between said zinc and said positive electrodes in facing relation therewith; means for imparting vibration to said current-collectors of said dissoluble zinc electrodes in a manner ensuring mechanical interaction between the entire surface of said zinc electrodes and said plastic separators and compaction of a sponge-zinc deposit forming on said zinc electrode in the process of charging.

2. A storage cell as defined in claim 1, wherein the ends of said zinc electrodes, adjacent the bottom of said jar, are bent at an angle with respect to the surface thereof, thereby ensuring intensive stirring and accelerating the dissolution of zinc oxide accumulating on the bottom of the jar in the course of discharging.

3. A storage cell as defined in claim 1, wherein the ends of said zinc electrodes adjacent the bottom of said jar are connected by a perforated plate ensuring intensive stirring and accelerating the dissolution of zinc oxide accumulating on the bottom of the jar in the course of discharging.

4. A storage cell as defined in claim 1, wherein the plastic separators are made in the form of perforated plastic plates of abrasion-resistant materials.

5. A storage cell as defined in claim 1, wherein the plastic separators are made of woven or pressed plastic grates or nets resistant to abrasion.

6. A storage cell as defined in claim 1, comprising supports mounted in each interelectrode clearance to which are secured said positive electrodes and plastic separators, said supports forming a space for the deposition of the sponge-zinc deposit and preventing deformation of said positive electrodes in the process of cycling.

7. A storage cell as defined in claim 6, wherein said supports have slots in which said zinc electrodes are movably engaged.

8. A storage cell as defined in claim 1, wherein said zinc electrode consists of at least two layers applied onto a current-collecting bar, the layer adjacent to said plastic separator having a lesser porosity.

9. A storage cell as defined in claim 8, wherein the layer adjacent to said plastic separator has from 30 to 70 percent porosity while the layer adjacent to said current-conducting bar of said zinc electrode has from 70 to 90 percent porosity.

10. A storage cell as defined in claim 1, wherein said means for imparting vibration to said current-collectors and said zinc electrodes connected therewith comprises a cam drive mounted on the outer surface of said electrolyte-filled jar and connected to said current-collectors of the zinc electrodes, for effecting circular vibration of said zinc electrodes.

11. A storage cell as defined in claim 1, wherein said current-collectors of the zinc electrodes and said zinc electrodes connected therewith are vibrated at least in part in the direction of the vertical axis of the storage cell.

12. A storage cell as defined in claim 1, wherein said current-collectors of the zinc electrodes are vibrated with an amplitude exceeding the diameter of said holes in the plastic separators.

13. A storage cell as defined in claim 1, comprising an electrochemical filter disposed on the bottom of the electrolyte-filled jar, said filter vibrating in the process of charging thus ensuring the dissolution of sponge-zinc deposit particles shed from the electrode.

14. A storage cell as defined in claim 1, wherein the current-collector of the zinc electrodes is provided with an elastic compensator having a corrugated surface whose total length is at least twice as large as the distance between the points of attachment thereof to the jar cover and to the current-collector of the negative electrode.

* * * * *